Aug. 30, 1949.　　　　　　A. L. DOW　　　　　2,480,229
PISTON ROD PACKING LUBRICATOR
Filed Nov. 23, 1945

INVENTOR.
ARTHUR L. DOW
BY M. B. Tasker
ATTORNEY.

UNITED STATES PATENT OFFICE 2,480,229

PISTON ROD PACKING LUBRICATOR

Arthur L. Dow, Easton, Conn., assignor to United Aircraft Corporation, East Hartford, Conn., a corporation of Delaware Application November 23, 1945, Serial No. 630,444

5 Claims. (Cl. 286—17)

This invention relates to hydraulic struts of the type used in aircraft and particularly to improvements in lubrication of the piston rods of such struts.

Hydraulic struts used in aircraft, for example, to operate retractable landing gear, are provided with a metallic, usually bronze, annular wiper ring which is loosely mounted at the outermost end of the cylinder cap but which has its inner diameter fitted to the piston rod for a tight sliding fit thereon. The function of this wiper ring is to remove any dust or other dirt which may have accumulated on the piston rod during the period it has been withdrawn from the cylinder as the rod is returned to the cylinder. Unfortunately in removing dust and other foreign particles from the surface of the piston rod, the wiper ring also removes the film of lubricating oil on the piston rod surface so that the rod is dry as it passes through the cylinder cap into the cylinder and the rubber "O" ring packing seal in the cylinder cap cleaves to the dry piston rod surface. This sticking of the rubber packing to the piston rod surface prevents efficient operation of the strut, greatly shortens the life of the packing and frequently causes an immediate leak.

It is an object of this invention to provide automatic lubrication of the surface of hydraulic strut piston rods between the wiper ring and the "O" ring packing as the piston rod returns into the cylinder.

Another object of the invention is to provide improved automatic lubrication for the piston rods of hydraulic struts utilizing oil under pressure from within the cylinder of the strut.

A further object of the invention is generally to improve the construction and operation of hydraulic struts.

These and other objects and advantages of the invention will be apparent from the following detailed description of two embodiments of the invention which have been shown for purposes of illustration in the accompanying drawings.

In these drawings.

Figure 1:
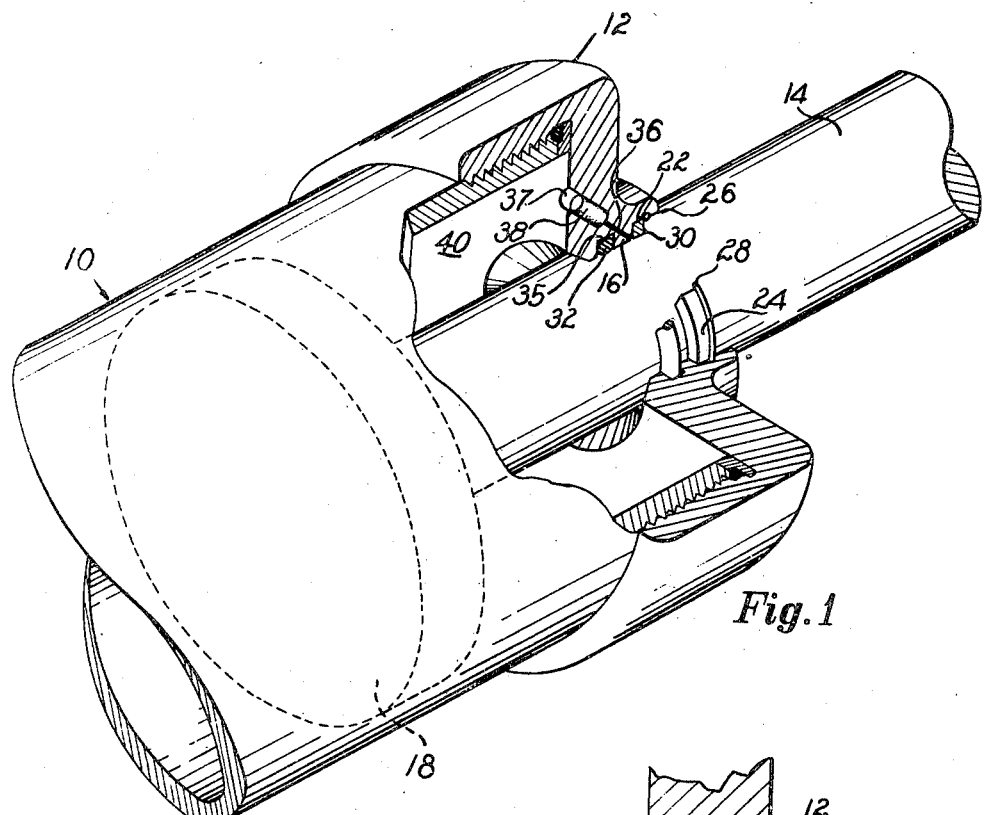
Fig. 1 is a perspective view of the cap and the piston rod of a hydraulic strut having the improved lubricating means between the wiper ring and the "O" ring packing.

In Fig. 1, 10 represents the hydraulic cylinder and 12 represents the cap of a hydraulic strut commonly used in aircraft, e. g. for operating retractable landing gear or for moving various control surfaces. A piston rod 14 extends through an axial aperture 16 in the cap 12 and terminates in a piston 18 within the cylinder. The cap 12 has an annular flange 20 surrounding the passage 16 which is provided with an axial recess, or groove, 22 in which the usual annular bronze wiper ring 24 is loosely received, this ring being slightly smaller in diameter than the bottom of the groove. The cap 12 has an annular flange 26 formed by an annular groove in the passage 16 and in the groove behind it a resilient locking ring 28 is disposed which holds the wiper ring 24 loosely against displacement in the recess, the ring 24 being in effect floating in groove 22. While the outer diameter of ring 24 is somewhat smaller than the diameter of recess 22, its internal diameter is such that it has a tight sliding fit on the external surface of the piston rod 14. The ring 24 is further provided with a feather wiping edge 30 which in a usual manner enables this ring to remove all foreign particles from the surface of the piston rod as the latter is moved into the cylinder.

An "O" ring packing 32 of rubber or rubber-like material is also provided in a suitable groove 35 in the passage 16 adjacent the inner wall of the cap which provides the hydraulic seal between the piston rod and the cap for preventing leakage of the high pressure fluid in the cylinder through passage 16 around the piston rod 14.

The groove 35 has a depth which is slightly less than the circular cross section of the rubber "O" ring so that the latter is somewhat compressed between the bottom of the groove and the piston rod 14. The width of the groove 35, however, is somewhat greater than the cross section of the "O" ring so that the ring as a result of reciprocating movement of the rod is caused to roll along the bottom of the recess, thus providing a beneficial kneading action to the rubber.

In accordance with the present invention, lubricating means are provided for automatically lubricating the piston rod surface between the ring 24 and the "O" ring packing 32 upon the return stroke of the piston rod into the cylinder. To this end, an oblique passage 36 is provided in the cap 12, one end of which terminates at the inner end of groove 22 for the wiper ring 24 at the surface of piston rod 14 and the opposite end of which extends into the cylinder and is in communication with the high pressure fluid in the cap end of the cylinder. The passage 36 is small in diameter, being only large enough to permit free passage of lubricating oil to groove 22. At its inner end the passage 36 is provided with a counterbore 37 to receive a flow restricting plug, or pellet, 38 the inner end of which is subjected to the high pressure fluid in the cylinder 10 whenever fluid is admitted to chamber 40 to return the piston rod to the cylinder.

The pellet 38 may be formed of various substances, the only requirements being that it be inert and that it have a porous structure such that it allows only a limited, predetermined quantity of oil to pass through it under the pressure prevailing in the cylinder. For example, the plug may be made of a powdered metallic substance which has been compressed to a predetermined density, the degree of compression being determined by the nature and fineness of the material and the pressure of lubricating oil to which it is to be subjected and to some extent the viscosity of the oil used in the strut.

The porosity of the metallic pellet 38 is so designed that the oil admitted under pressure to the cylinder 10 on the cap side of the piston penetrates through the pores of this pellet very slightly but sufficiently to discharge enough oil into the groove 22 to spread a very thin film of lubricating oil on the piston rod surface which has been wiped dry by the ring 24 before this surface engages the "O" ring 32. It will be understood that the quantity of oil which reaches the surface of the piston rod is only sufficient to provide a very thin surface film of lubricant to the piston rod during the "In" stroke of the latter when the rod surface is dry, and this only when actuating hydraulic fluid is admitted to the cap side of the piston, the pressure of oil on the surface of pellet 38 on the "Out" stroke of the piston being negligible and not sufficient to force oil through the very minute pores in the pellet 38. For example, if the hydraulic pressure admitted to the cylinder for the retraction of a landing gear strut were of the order of 1,000 p. s. i., the plug 38 would be designed for such a strut so that with this pressure acting on the exposed end of the plug 38 the oil transmitted through the pores of the metal will be just sufficient to lubricate the piston rod and prevent sticking of the "O" ring to the rod.

Figure 2:
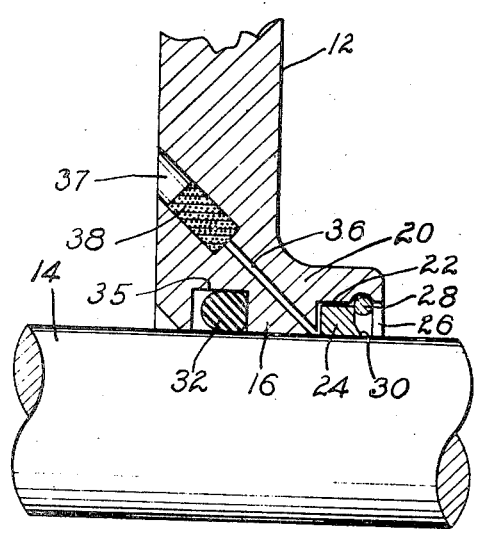
Fig. 2 is an enlarged sectional view of a portion of the cap of Fig. 1.
Figure 3:
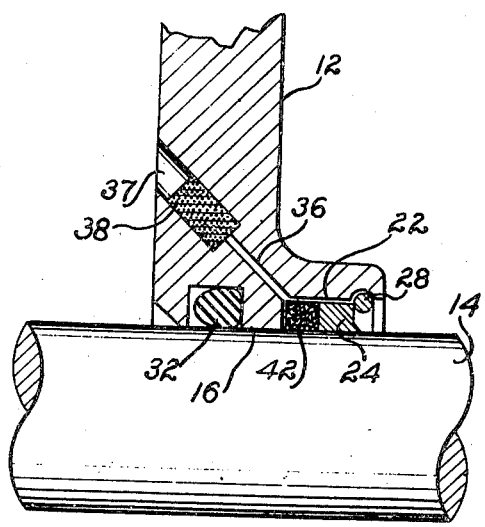
Fig. 3 is a view similar to Fig. 2 showing a modified construction.

In Fig. 3, a somewhat modified construction has been shown which has advantages in some installations. In this form of the invention the recess 22 is made somewhat deeper in order to accommodate an annular oil absorbent washer 42 between the wiper ring 24 and the inner end wall of the recess. The oil passage 36 in this construction communicates with the bottom of recess 22. Otherwise the construction is similar to that shown in Figs. 1 and 2. The washer 42 can be of felt or any oil absorbent material having sufficient resiliency to discharge its absorbed oil upon compression of the material.

It will be evident that oil which is discharged through passage 36 during the piston stroke in which the chamber 40 is under pressure will be absorbed by the washer 42 which spreads an even film of lubricant on the piston rod 14 as the latter moves inwardly, the washer being pressed firmly against the inner end wall of the recess 22 and against the rod during this movement by ring 24 which compresses the material of the washer as a result of its frictional engagement with rod 14.

On the outward stroke of the piston rod when no discharge of lubricant is desired, the washer is under no pressure and is relatively dry.

It will be understood that a plurality of passages 36 may be provided about the periphery of passage 16, each with its flow controlling pellet 38, if desired.

It will be evident that as a result of this invention a very simple and efficient means has been provided for automatically lubricating the surface of a hydraulic piston rod by which the critical problem of sticking of the "O" ring packing to the piston rod surface has been entirely eliminated. It will further be evident that this automatic lubrication has been accomplished by the utilization of oil under pressure available within the hydraulic cylinder of the strut but this only during the piston stroke when lubrication is desired with the result that servicing of the packing in such hydraulic struts has been greatly simplified and the operation of these struts has been greatly improved.

While two embodiments of the invention have been shown and described which are at present preferred embodiments, it will be understood that various changes in the construction and arrangement of the parts may be made without departing from the scope of the invention as defined in the following claims.

What I desire to secure by U. S. Letters Patent is as follows:

1. A hydraulic strut including a cylinder adapted to contain oil under pressure, said cylinder having a cylinder wall and a piston rod reciprocable in a passage in said wall, a packing between said wall and rod for sealing said passage, a wiper ring carried by said wall having a wiping engagement with the surface of said rod as the latter moves into the cylinder prior to its engagement with said packing, a duct in said wall discharging into said passage between said ring and said packing and communicating with said cylinder, and a pellet of porous material in said duct for limiting the flow of oil to said passage.

2. A hydraulic strut including a cylinder adapted to contain oil under pressure, said cylinder having a cylinder cap and a piston rod reciprocable in a passage in said cap, a fluid-tight packing between said cap and rod for sealing said passage around said rod, wiping means carried by said cap for wiping the surface of said rod as the latter moves into the cylinder prior to its engagement with said packing, a duct in said cap discharging at its outer end into said passage between said wiping means and said packing and communicating at its inner end with the cylinder, said duct having an enlargement at its inner end, and a mass of porous material in said enlargement for limiting the flow of oil through said duct.

3. A combination as defined in claim 2, in which the porous mass comprises a pellet of powdered metal compressed to have a predetermined density.

4. A hydraulic strut including a cylinder adapted to contain oil under pressure, said cylinder having a cylinder cap and a piston rod reciprocable in a passage in said cap, a fluid-tight packing between said cap and rod for sealing said passage around said rod, a recess in the wall of said passage adjacent the outer end thereof, a washer of absorbent material disposed in the inner end of said recess adjacent said packing having a wiping engagement with the surface of said rod, a wiper ring disposed in said recess abutting said washer having a wiping fit on the surface of said rod, a duct in said cap for supplying fluid from the cylinder to said washer, and means in said duct for limiting the quantity of oil supplied to said washer.

5. A hydraulic strut including a cylinder adapted to contain fluid under pressure, said cylinder having a cylinder cap and a piston rod reciprocable in a passage in said cap, a fluid-tight packing between said cap and rod for sealing said passage around said rod, an annular recess in said passage surrounding said rod, a body of absorbent material in said recess, a wiper ring slidable in said recess having a frictional wiping engagement with the surface of said rod which moves said ring into pressure engagement with said body of absorbent material during the movement of said rod into the cylinder, and means for supplying a predetermined limited amount of fluid from the hydraulic cylinder to said body of absorbent material upon each inward stroke of said piston rod.

ARTHUR L. DOW.

REFERENCES CITED

The following references are of record in the file of this patent:

UNITED STATES PATENTS

| Number | Name | Date |
|---|---|---|
| 1,010,498 | Hultgren | Dec. 5, 1911 |
| 1,687,780 | Meale | Oct. 16, 1928 |
| 1,992,746 | Fortune | Feb. 26, 1935 |
| 2,368,137 | Harmon | Jan. 30, 1945 |

OTHER REFERENCES

Product Engineering, Feb. 1945, page 103. (Copy in Div. 52 286-26-(1.1).